(12) United States Patent
Lin et al.

(10) Patent No.: US 8,804,376 B2
(45) Date of Patent: Aug. 12, 2014

(54) DC/DC CONVERTER WITH SELECTABLE COUPLING RATIO AND POWER INVERTER USING THE SAME

(75) Inventors: Yuchih Lin, Taipei (TW); Shao-Chung Chen, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 225 days.

(21) Appl. No.: 13/533,579

(22) Filed: Jun. 26, 2012

(65) Prior Publication Data

US 2013/0343092 A1    Dec. 26, 2013

(51) Int. Cl.
*H02M 3/335* (2006.01)
*H02M 5/458* (2006.01)

(52) U.S. Cl.
USPC ............................................. 363/17; 363/37

(58) Field of Classification Search
USPC ..................... 363/17, 37, 52, 56.02
See application file for complete search history.

(56) References Cited

U.S. PATENT DOCUMENTS

| | | | | |
|---|---|---|---|---|
| 5,404,059 A | * | 4/1995 | Loffler | 327/478 |
| 5,684,426 A | * | 11/1997 | De Doncker | 327/440 |
| 6,118,679 A | * | 9/2000 | Smith | 363/70 |
| 6,166,513 A | * | 12/2000 | Hammond | 318/764 |
| 6,424,543 B1 | * | 7/2002 | Zhang et al. | 363/17 |
| 6,747,881 B2 | * | 6/2004 | Schreiber | 363/37 |
| 7,505,289 B2 | * | 3/2009 | Kim et al. | 363/52 |

\* cited by examiner

*Primary Examiner* — Adolf Berhane
*Assistant Examiner* — Emily P Pham
(74) *Attorney, Agent, or Firm* — Tracy M. Heims; Apex Juris, pllc

(57) ABSTRACT

The DC/DC converter has a full bridge circuit, a transformer and a rectifying unit. The full bridge circuit is connected to a source DC voltage. The transformer is connected to full bridge circuit and receives the source DC. The transformer has a stationary winding and at least one selectable winding connected in series. If the source DC voltage is lower than a threshold value, the switch is turned on to increase the coupling ratio of the transformer. Therefore, the transformer converts the source DC to a DC voltage in a required voltage level.

8 Claims, 5 Drawing Sheets

DC/DC CONVERTER WITH SELECTABLE COUPLING RATIO AND POWER INVERTER USING THE SAME

BACKGROUND OF THE INVENTION

1. Field of the Invention

The invention relates to a DC/DC converter, and more particularly to a DC/DC converter that is able to change a coupling ratio for producing a DC voltage in a required voltage level and further selects a rectifier to rectify the DC voltage.

2. Description of Related Art

With reference to FIG. 5, a conventional inverter for converting an input DC voltage to an output AC voltage mainly includes three stages, a boost unit 50, a DC/DC converter 60 and a DC/AC converter 70. The DC/DC converter 60 mainly comprises a transformer T1 and a bridge rectifier consisting of four diodes D2-D5.

The three-stage configuration of the conventional inverter is complicated and high power consumption. When the input DC voltage on the capacitor C1 is relatively low, the boost unit 50 needs to increase the voltage of the capacitor C1. Therefore, there will be more power loss resulting from the boost unit 50 when the input DC voltage is low.

SUMMARY OF THE INVENTION

A main objective of the present invention is to provide a DC/DC converter that has a relative simple circuit configuration and is able to change a coupling ratio of a transformer for producing a DC voltage in a required voltage level and select proper diodes to form a rectifier for rectifying the DC voltage.

The DC/DC converter in accordance with the present invention comprises a full bridge circuit, a transformer and a rectifying unit.

The full bridge circuit has four power transistors to form two input terminals and two output terminals, wherein the two input terminals are adapted to connect to a source DC voltage.

The transformer has a primary side and a secondary side. The primary side has a primary winding connected to the two output terminals of the full bridge circuit. The secondary side has a stationary winding and at least one selectable winding connected in series. The selectable winding is connected to the rectifying unit The rectifying unit is formed by multiple diodes and connected to the secondary side of the transformer.

Depending on the magnitude of the source DC voltage, the coupling ration of the transformer can be changed by turning on or off the switch of the selectable winging. Therefore, the transformer will have a proper coupling ratio to produce a DC voltage in a required voltage level at the secondary side. As the switch turns on, a rectifier is formed by four of the diodes to rectify the produced DC voltage.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
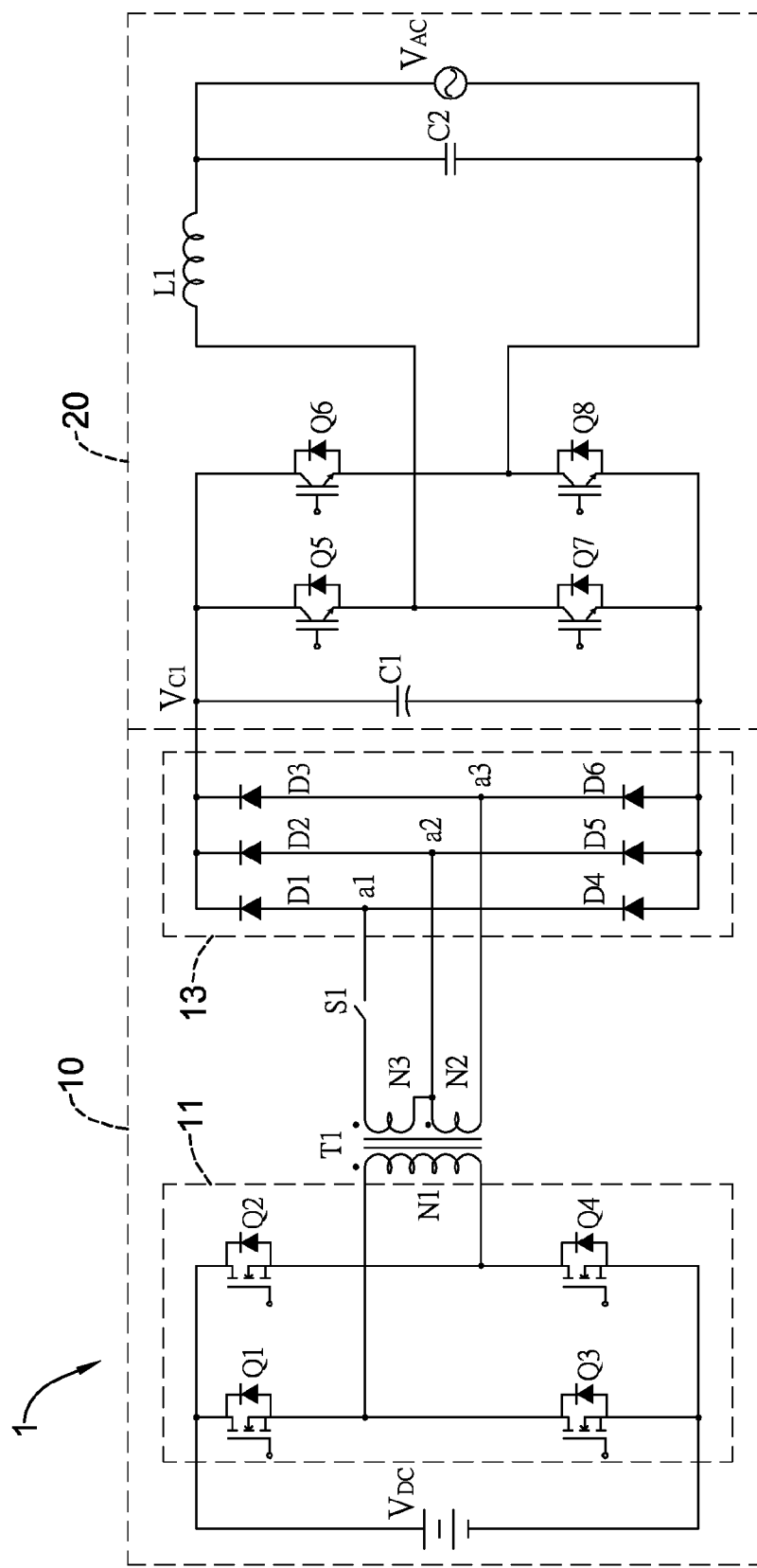
FIG. 1 is a circuit diagram of a power inverter comprising a DC/DC converter in accordance with a first embodiment of the present invention.

With reference to FIG. 1, as an example, a DC/DC converter 10 of the present invention is applied in a power inverter 1. In addition to the DC/DC converter 10, the power inverter 1 further includes a DC/AC converter 20. The power inverter 1 converters a source DC voltage $V_{DC}$ generated from solar energy to an AC voltage required.

The DC/DC converter 10 comprises a full bridge circuit 11, a transformer T1 and a rectifying unit 13.

The full bridge circuit 11 includes four power transistors Q1-Q4 to form two input terminals and two output terminals. The two input terminals are connected to the source DC voltage $V_{DC}$. A DC bus capacitor C1 is connected to the output terminals of the rectifying unit 13.

The rectifying unit 13 is formed by P diodes, wherein P=2M+2 and M is the number of secondary windings of the transformer T1. Because M is 2 in this embodiment, the rectifying unit 13 is formed by 6 diodes D1-D6. Every two of the diodes D1-D6 are connected in series at a corresponding node a1-a3 to form a branch, and all the branches are connected in parallel. For example, the diodes D1 and D4 are connected in series at the node a1, the diodes D2 and D5 are connected in series at the node a2, and the diodes D3 and D6 are connected in series at the node a3.

The transformer T1 has a primary side and a secondary side. The primary has a primary winding N1 connected to the output terminals of the full bridge circuit 11. The secondary side has M secondary windings including a stationary winding N2 and at least one selectable winding N3, wherein M≥2. In this embodiment, there are a stationary winding N2 and a selectable winding N3. The stationary winding and the selectable winding may have the same or different number of turns of coils.

Figure 2:
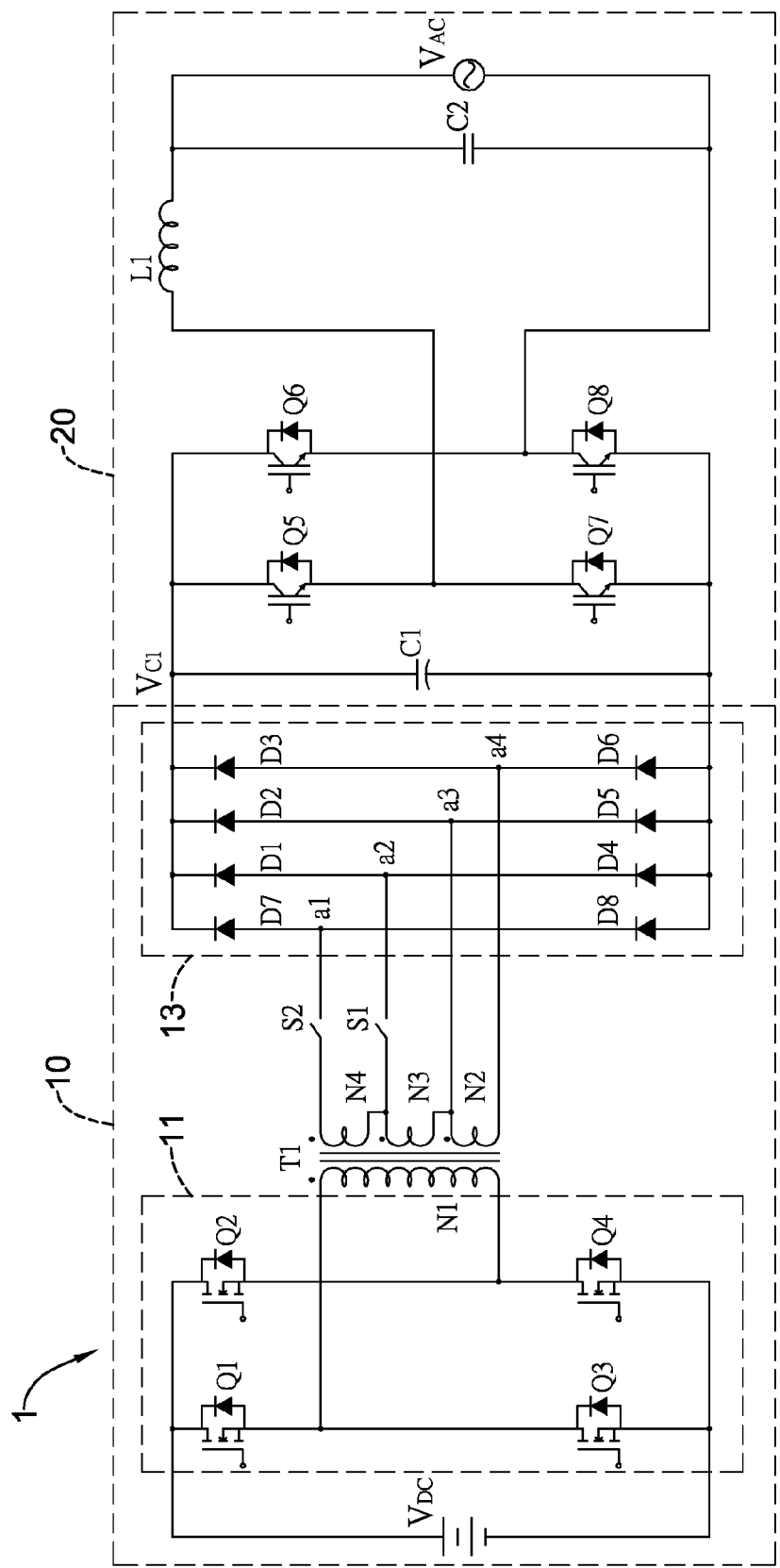
FIG. 2 is a circuit diagram of a power inverter comprising a DC/DC converter in accordance with a second embodiment of the present invention.

With further reference to FIG. 2 of the second embodiment, the transformer T1 has a stationary winding N2 and two selectable windings N3, N4. The rectifying unit 13 has four branches. Each of the windings N2, N3 and N4 at the secondary side has a first end and a second end. The windings N2, N3 and N4 at the secondary side are connected in series. The two ends of the stationary winding N2 are connected to the nodes a3 and a4 of two branches of the rectifying unit 13. For each of other selectable windings N3, N4, the first end is further connected to a corresponding node a1 and a2 through a respective switch S1, S2.

The DC/AC converter 20 is connected to the DC/DC converter 10 to receive the DC voltage generated by the DC/DC converter 10 and then converts the DC voltage to the AC voltage Vac.

Figure 3:
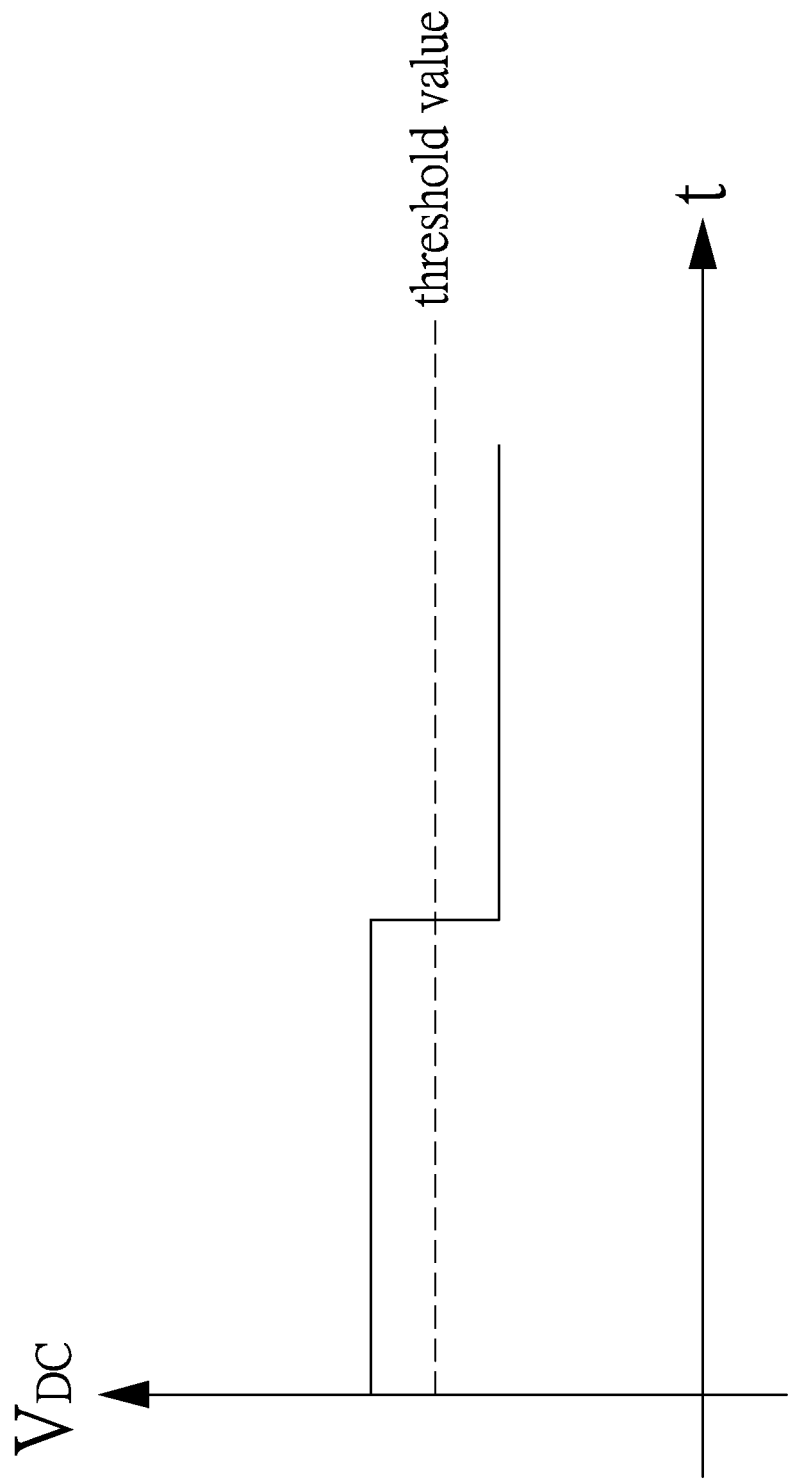
FIG. 3 shows a threshold value for comparing with a source DC voltage $V_{DC}$ of the present invention.

With reference to FIG. 3, when the DC voltage $V_{DC}$ is greater than a threshold value, which means the solar energy is sufficient, the switch S1 connected to the selectable winding N3 is controlled to turn off. Therefore the selectable winding N3 is in an open circuit state and disabled. The transformer T1 couples energy from the primary winding N1 to the stationary winding N2. The four diodes D2, D3, D5, D6 of the rectifying unit form a rectifier. The two diodes D2, D6 or the other two diodes D3, D5 in the different branches are alternately conducted to transfer the energy to the DC/AC converter 20. The DC/AC converter further converts the bus voltage $V_{C1}$ to the AC voltage Vac required. The AC current can be fed into an electrical grid system.

If the DC voltage $V_{DC}$ is relative low and smaller than the threshold value, the switch S1 will be turned on (closed) to connect the two secondary windings N2, N3 in series. As the number of the secondary windings N2, N3 connected in series increases, the transformer T1 will have a higher coupling ratio to generate a higher voltage at the secondary side. In this situation, the diodes D1, D3, D4 and D6 of the rectifying unit 13 form a rectifier. The two diodes D1, D6 or the other two diodes D3, D4 in the different branches are alternately conducted to transfer the high voltage at the secondary side to the DC/AC converter 20. Even the source DC voltage $V_{DC}$ from the solar energy is relative low, the bus voltage $V_{C1}$ on the DC bus capacitor C1 is increased to be higher than the peak voltage of the electrical grid system so that the generated AC current (Iac) can be fed into the electrical grid system.

With reference to FIG. 2, the number of the secondary windings of the transformer T1 may be more than two by demand to produce a high voltage required at the secondary side. Therefore, two threshold values $V_{TH1}$, $V_{TH2}$ for comparing with the source DC voltage $V_{DC}$ are applied to determine whether the switches S1, S2 should be turned on or off.

Figure 4:
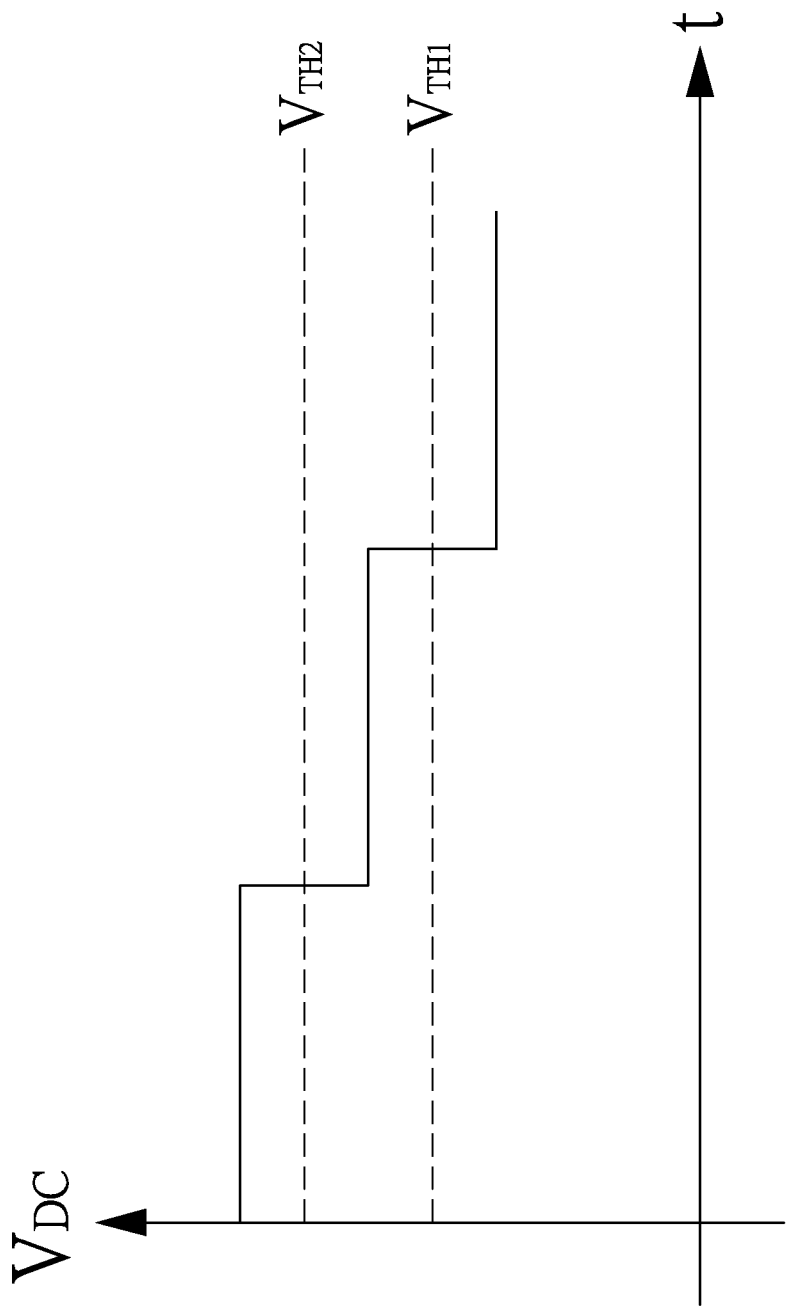
FIG. 4 shows two threshold values for comparing with a source DC voltage $V_{DC}$ of the present invention.
Figure 5:
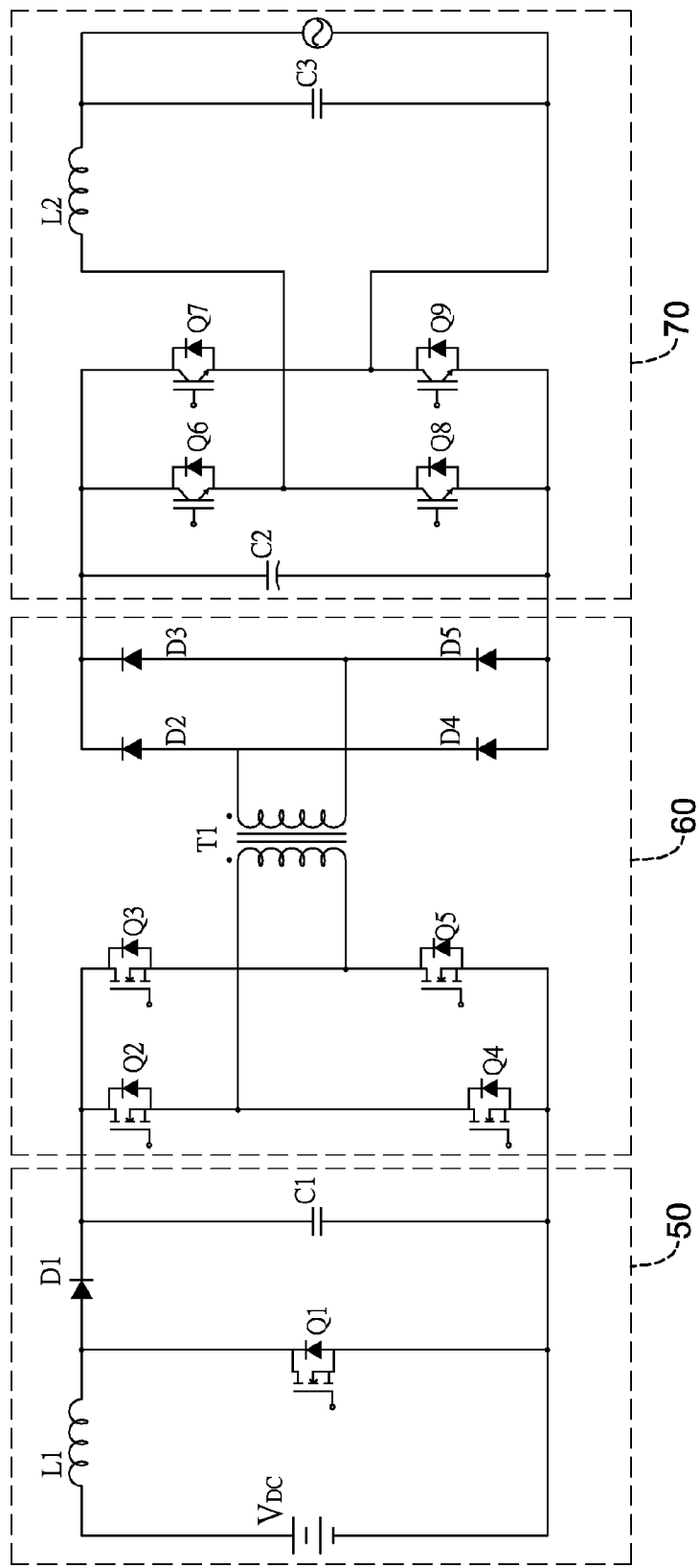
FIG. 5 is a circuit diagram of a conventional power inverter.

With reference to FIGS. 2 and 4, if the source DC voltage $V_{DC}$ is greater than the two threshold values $V_{TH1}$, $V_{TH2}$, all the two switches S1, S2 are turned off. The energy at the primary side of the transformer T1 is only coupled to stationary winding N2. If $V_{TH2} \geq V_{DC} \geq V_{TH1}$, only the first switch S1 is turned on. If the source DC voltage $V_{DC}$ is lower than the first threshold value $V_{TH1}$, only the second switch S2 is turned on. In the situation that the second switch S2 is turned on, the transformer T1 has the highest coupling ratio. The four diodes D3, D6 D7 and D8 commonly form a rectifier. The two diodes D7, D6 and the other two diodes D3 and D8 are alternately conducted to transfer the energy at the secondary side of the transformer T1 to the DC/AC converter 20.

In conclusion, the power inverter only includes two stages, a DC/DC converter and a DC/AC converter. The circuit configuration is simplified by removing the boost unit. The DC/DC converter maintains a high power converting efficiency even the source DC voltage is relatively low in voltage level.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A DC/DC converter with selectable coupling ratio, characterized in that the DC/DC converter comprises:
    a full bridge circuit having four power transistors to form two input terminals and two output terminals, wherein the two input terminals are adapted to connect to a source DC voltage;
    a transformer comprising
        a primary side having a primary winding connected to the two output terminals of the full bridge circuit;
        a secondary side having M secondary windings that include a stationary winding and multiple selectable windings, wherein M≥2, and each of the secondary windings has a first end and a second end;
    a rectifying unit formed by P diodes, wherein P=2M+2, every two of the diodes are connected in series at a node to form a branch, and all the branches are connected in parallel;
    the first end and the second end of the stationary winding connected to the two nodes of two of the branches respectively;
    the first ends of the multiple selectable windings connected, through multiple switches respectively, to the nodes of other branches that are not connected to the stationary winding;
    wherein one of the multiple switches of the selectable windings is selected based on a magnitude of the source DC voltage and turned on so that a coupling ratio of the transformer is changed to produce a DC voltage with a required voltage level at the secondary side of the transformer.

2. The DC/DC converter as claimed in claim 1, wherein the stationary winding is connected in series with one selectable winding or more than one selectable windings to increase the coupling ratio of the transformer when the selected switch is turned on.

3. The DC/DC converter as claimed in claim 1, wherein there are M-1 numbers of the switches, and there are M-1 numbers of threshold values for comparing with the magnitude of the source DC to determine which one of the switches should be turned on.

4. The DC/DC converter as claimed in claim 3, wherein the wherein the stationary winding and the selectable winding have different numbers of turns of coils.

5. A DC/DC converter with selectable coupling ratio comprising:
    a full bridge circuit having four power transistors to form two input terminals and two output terminals, wherein the two input terminals are adapted to connect to a source DC voltage;
    a transformer comprising a primary side and a secondary side, wherein the primary side has a primary winding, and the secondary side has
        a stationary winding having two ends; and
        a selectable winding having two ends, wherein one of the two ends is connected to a switch, the other end is connected to the stationary winding in series;
    a rectifying unit formed by six diodes, wherein every two of the diodes are connected in series at a node to form a first branch, a second branch and a third branch, and all the branches are connected in parallel;
    the switch connected to the selectable winding is further connected to the node of the first branch;
    the two ends of the stationary winding are connected to the nodes of the second branch and the third branch respectively;
    the switch is controlled to turn on to connect the stationary winding and the selectable winding in series and to increase a coupling ratio of the transformer when the source DC voltage is smaller than a threshold value.

6. The DC/DC converter as claimed in claim 5, wherein the stationary winding and the selectable winding have the same number of turns of coils.

7. The DC/DC converter as claimed in claim 5, wherein the switch is controlled to turn off when the source DC voltage is higher than the threshold value.

8. A power inverter comprising:
- a full bridge circuit having four power transistors to form two input terminals and two output terminals, wherein the two input terminals are adapted to connect to a source DC voltage;
- a transformer comprising
  - a primary side having a primary winding connected to the two output terminals of the full bridge circuit;
  - a secondary side having M secondary windings that include a stationary winding and multiple selectable windings, wherein M≥2, and each of the secondary windings has a first end and a second end;
- a rectifying unit formed by P diodes, wherein P=2M+2, every two of the diodes are connected in series at a node to form a branch, and all the branches are connected in parallel;
- the first end and the second end of the stationary winding connected to two nodes of two of the branches respectively;
- the first ends of the multiple selectable windings connected, through multiple switches respectively, to the nodes of the branches that are not connected to the stationary winding;
- wherein one of the multiple switches is selected and turned on based on a voltage level of the source DC voltage so that a coupling ratio of the transformer is changed to produce a DC voltage required at the secondary side, and the DC voltage is further rectified by the rectifying unit to generate a rectified DC voltage;
- a DC/AC converter connected to the rectifying unit and converting the rectified DC voltage to an AC voltage required.

* * * * *